United States Patent [19]

Fouassier et al.

[11] 4,122,349

[45] Oct. 24, 1978

[54] NOVEL LUMINOPHORES EMITTING ULTRAVIOLET RADIATION, AND USES THEREOF

[75] Inventors: Claude Fouassier, Gradignan; Bertrand Latourette, Merignac, both of France

[73] Assignee: Rhone-Poulenc Industries, Paris, France

[21] Appl. No.: 762,473

[22] Filed: Jan. 26, 1977

[30] Foreign Application Priority Data

Feb. 5, 1976 [FR] France .................................. 76 03176

[51] Int. Cl.² ............................................. C09K 11/46
[52] U.S. Cl. ................................ 250/504; 250/461 R; 250/493; 252/301.4 F; 252/301.4 H
[58] Field of Search ................. 252/301.4 F, 301.4 H; 250/484, 372, 461, 504, 493; 96/27 F; 303/483

[56] References Cited

U.S. PATENT DOCUMENTS 3,630,945  12/1971  Hoffman ....................... 252/301.4 H

FOREIGN PATENT DOCUMENTS

| 43-27736 | 11/1968 | Japan ............................ 252/301.4 F |
| 45-37299 | 11/1970 | Japan ............................ 252/301.4 F |
| 46-3447 | 1/1971 | Japan ............................ 252/301.4 F |

*Primary Examiner*—Jack Cooper
*Attorney, Agent, or Firm*—Bacon & Thomas

[57] ABSTRACT

Novel alkaline earth metal fluosilicates which are activated with divalent europium are disclosed corresponding to the formula:

$$M_{1-x} Eu_x^{2+} Si F_6$$

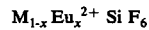

wherein $0 < x \leq 0.2$ and M represents at least one alkaline earth metal from the group of barium and srontium. These fluosilicates exhibit luminescent activities emitting sharp line radiation in the near ultraviolet region and are especially suited for producing black light, e.g., within discharge lamps.

6 Claims, 4 Drawing Figures

NOVEL LUMINOPHORES EMITTING ULTRAVIOLET RADIATION, AND USES THEREOF

BACKGROUND OF THE INVENTION

1. Field of the Invention

The present invention relates to new alkaline earth metal fluosilicates which are activated with divalent europium and are useful as luminescent materials.

2. Description of the Prior Art

Divalent europium is a well known activator for luminescent materials and it usually produces broad band emissions in the visible blue region and the near ultraviolet region. Compounds which are activated with divalent europium and which exhibit a narrow band emission in the near ultraviolet region are also known. Thus, the U.S. Pat. No. 3,630,945 discloses alkaline earth metal aluminum fluorides which are activated with divalent europium and which exhibit a sharp line ultraviolet emission spectrum which is characterized by 4f to 4f energy level transitions. Nevertheless, this spectrum exhibits the disadvantage of a broadening of the base of the emission peak which results from an emission which is due to 5f to 4f transitions. This proves to be troublesome for any applications which require a spectral separation of a very narrow emission.

SUMMARY OF THE INVENTION

It is an object of the present invention to provide new luminescent compounds which are activated with divalent europium and which overcome the above-mentioned disadvantages.

It is a special object of the present invention to provide new luminescent compounds which are activated with divalent europium and which exhibit a very intense sharp line emission spectrum, preferably a spectrum which is practically limited to one very narrow peak.

It is a further object of the present invention to provide a new luminescent compounds which are activated with divalent europium and which exhibit an emission which exclusively results from $4f$ to $4f$ energy level transitions.

It is a further object of the present invention to provide new luminescent compounds which exhibit an intense emission of about 3600Å.

It is a further object of the present invention to provide new luminescent compounds which are effective in producing black light and can be used within devices for producing black light.

It is a further object of the present invention to provide new luminescent compounds which are especially useful in photochemical reproduction procedures.

It is a further object of this invention to provide a process for preparing new luminescent compounds which are activated with divalent europium.

It is a further object of this invention to provide a method for producing black light.

In order to accomplish the foregoing objects according to the present invention there are provided new luminescent alkaline earth metal fluosilicates activated with divalent europium which correspond to the Formula I:

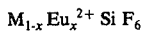

$M_{1-x} Eu_x^{2+} Si F_6$     [I]

wherein $0 > x \leq 0.2$ and $M$ represents at least one alkaline earth metal selected from the group consisting of barium and strontium.

The luminescent fluosilicates of Formula I can be prepared by various art recognized methods. Notably, the compounds of Formula I are prepared by reacting salts, preferably fluorides, of the alkaline earth metals M and the divalent europium, e.g., mixtures of these salts or solid solutions thereof, with $H_2SiF_6$ or $SiF_4$.

According to the present invention, there are further provided luminescent compositions comprising fluosilicates of the Formula I and, optionally, an inert diluent. The fluosilicates of Formula I are useful for producing black light, namely, they can be used for all purposes for which an intense emission of about 3600Å [which corresponds to black light] is needed; they are advantageously used within devices, e.g., discharge lamps which produce black light, e.g., for photochemical reproduction processes.

Also according to the present invention, there too is provided a method for producing black light by irradiating a luminescent material which comprises at least one compound of Formula I. The irradiation is preferably effected with an ultraviolet radiation, preferably of a wavelength of between about 2300Å and about 3200Å, especially about 2537Å.

Further objects, features and advantages of the present invention will become apparent from the detailed description of the invention which follows, when considered together with the accompanying Figures of Drawing.

DETAILED DESCRIPTION OF THE INVENTION

Figure 1:
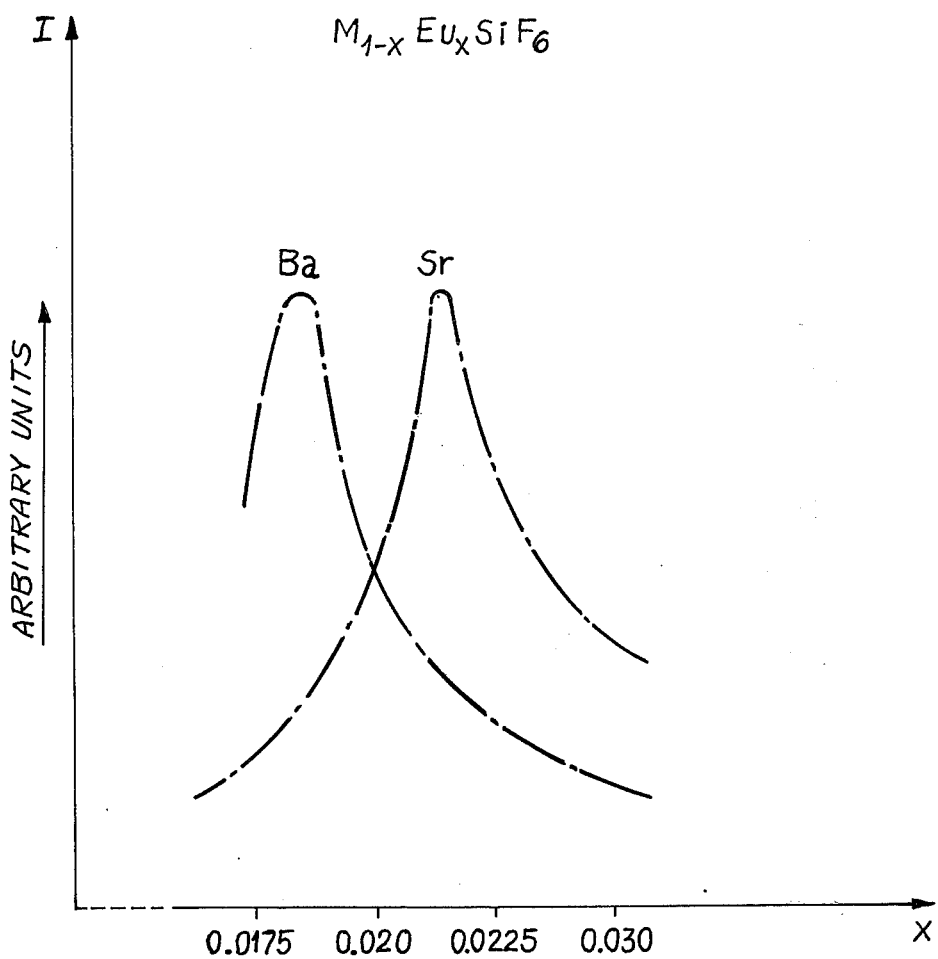
FIG. 1 is a graph showing the relationship between the intensity of emission and the value of $x$.

The molar portion $x$ of the divalent europium within the luminescent compounds of Formula I according to the present invention preferably is between 0.01 and 0.03. Studies as to how the degree of substitution by divalent europium influences the intensity of emission for each of the compounds $M_{1-x} Eu_x Si F_6$ wherein M is barium and wherein M is strontium reflect that the optimum values for $x$ are 0.0175 if M is barium, and 0.0225 if M is strontium. The curves which are shown in FIG. 1 represent the variations of the intensities of the emissions as a function of $x$.

The luminescent materials according to the present invention are derivatives of the corresponding alkaline earth metal fluosilicates wherein a portion of the alkaline earth metal ions is substituted by europium 2+ ions. The structures of Ba Si $F_6$ and Sr Si $F_6$ are as follows:

The barium fluosilicate crystallizes in the rhombohedral structure [Hoard J. L. And Vincent W. B., *J. Amer.*

*Chem. Soc.*, 62, 3126 (1940)] with the space group R 3m and the following hexagonal parameters:

$$a_h = 7.1854 \text{Å}$$

$$c_h = 7.0102 \text{Å}$$

[R,W,G, Wyckoff, *"Crystal Structure"*, Vol. 3, p. 332, Interscience Publishers, New York (1965)]. This structure is characterized by $SiF_6^{2-}$ octahedrons, whereby the barium exhibits a coordination value of 12. The point group of the alkaline earth metal is $D_{3d}$.

The strontium fluosilicate is isotypical to its barium congener. Its powder diagram is known to be a hexagonal system, with the following parameters:

$$a_h = 6.973 \text{Å} \quad c_h = 6.674 \text{Å}$$

If, within the Formula I, M represents a mixture of strontium and barium, the substitution of strontium by barium causes expansion of the crystallographic latice within the fluosilicates according to the present invention, without changing their structure. If $y$ represents the degree of substitution, the formula of the compounds according to the present invention may be written as follows:

$$Sr_{1-y} Ba_{y-x} Eu_x Si F_6$$

wherein $x$ is as defined above.

The luminescent materials according to this invention exhibit an elevated intensity of fluorescence in the form of a spectrum of sharp lines within a very narrow spectral range (3500 – 3700Å) in the ultraviolet region. The region of the excitation radiation is such that its wavelength is between about 2300Å and 3200Å.

Figure 2:
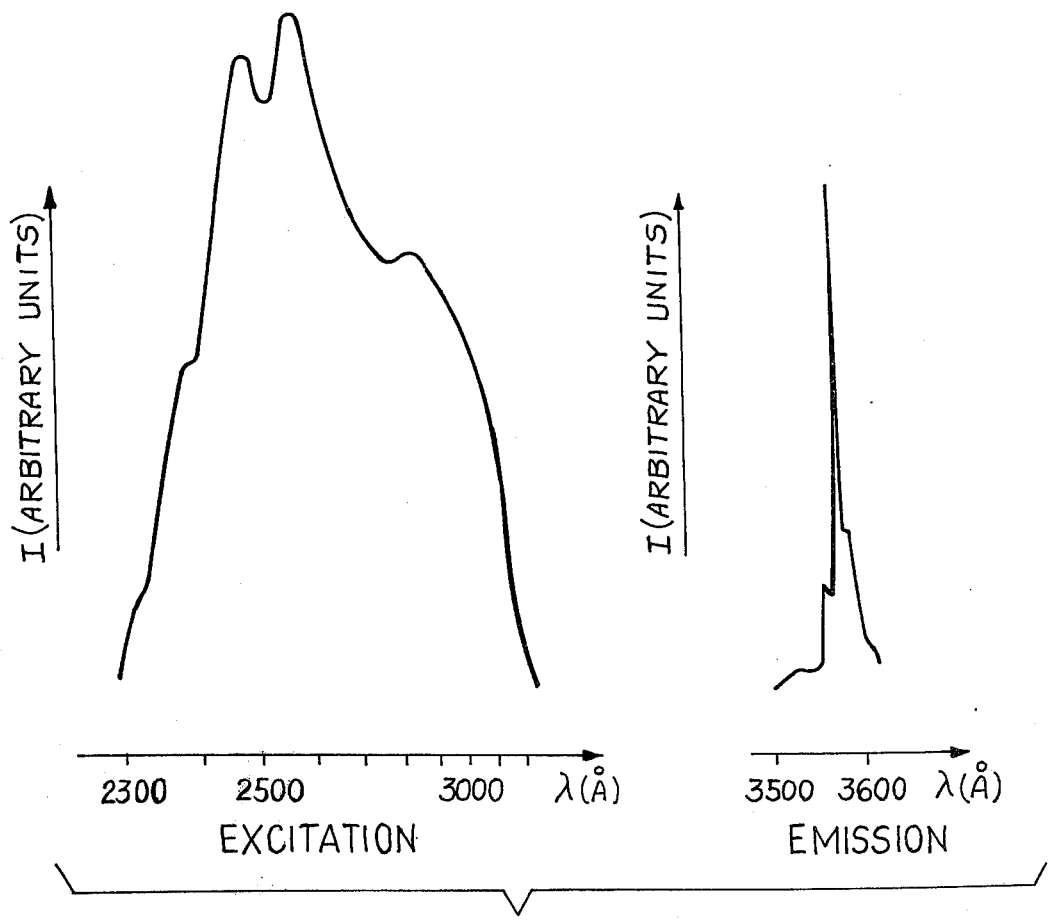
FIG. 2 is a spectrum showing the relationship between the intensity and the wavelength of excitation and emission for the compound of the formula $Ba_{0.9825} Eu_{0.0175} Si F_6$.
Figure 3:
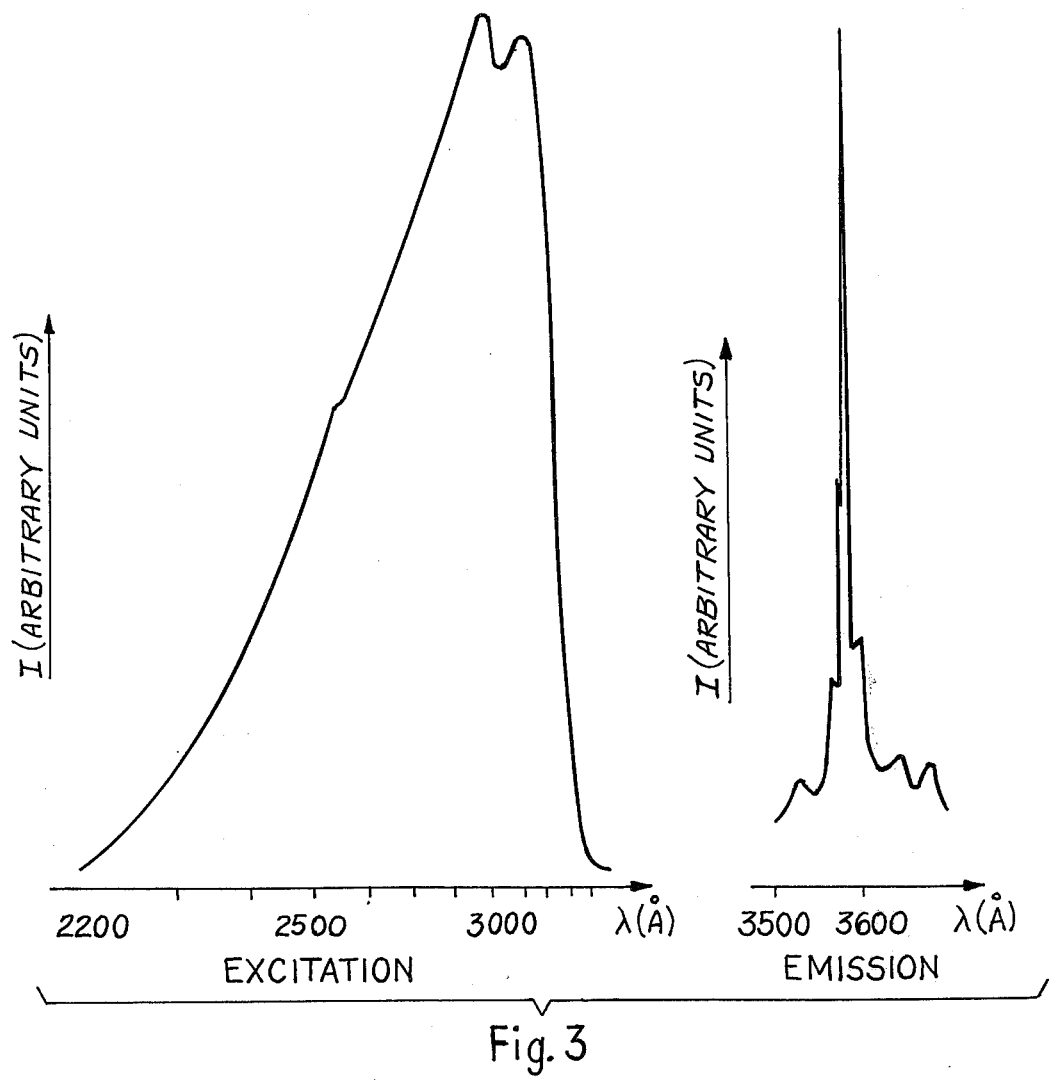
FIG. 3 is a spectrum showing the relationship between the intensity and the wavelength of excitation and emission for the compound of the formula $Sr_{0.9775} Eu_{0.0225} Si F_6$.
Figure 4:
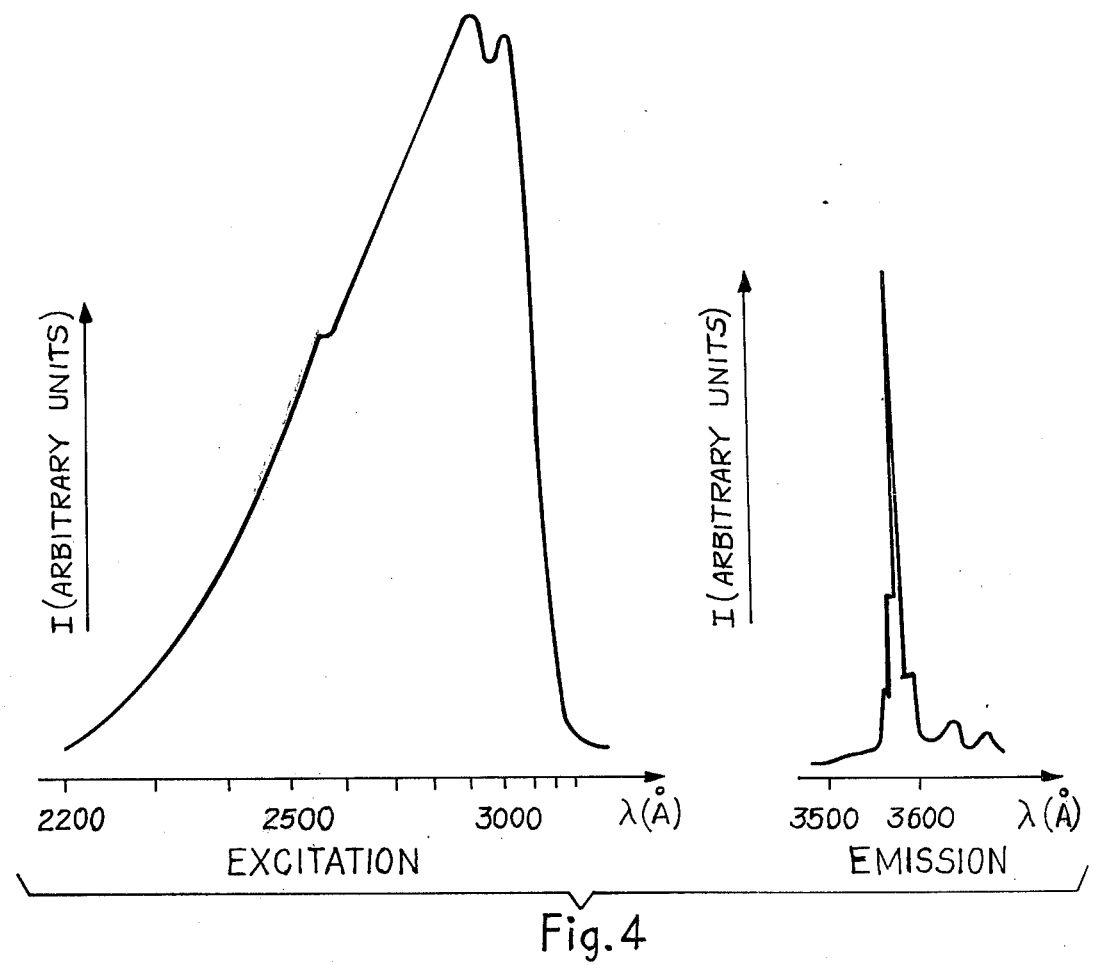
FIG. 4 is a spectrum showing the relationship between the intensity and the wavelength of excitation and emission for the compound of the formula $Sr_{0.489} Ba_{0.489} Eu_{0.0222} Si F_6$.

The emission and excitation spectra of the principal types of luminescent compounds according to this invention are shown in FIGS. 2, 3 and 4 of the Drawing.

The compounds of Formula I can be prepared from salts of the alkaline earth metals M and of the divalent europium. Besides fluorides, corresponding salts with various other acids can also be used. Instead of a salt of divalent europium, salts of trivalent europium may be used and the mixture subsequently reduced by known methods.

For example salts of the alkaline earth metals M and the divalent europium are fluorides, chlorides, sulfates, carbonates. If salts of trivalent europium are used salts of the alkaline earth metals M are chlorides, carbonates, fluorides, and salts of trivalent europium are chlorides, fluorides, carbonates and perchlorates. Further one can used instead of salts the oxides.

The alkaline earth metal fluosilicates which are activated with europium according to this invention are useful for producing black light, that is, they can be used for all purposes where black light is required.

Photochemical reproduction of documents is one of the areas wherein black light is used. Copies of such documents can be obtained by exposing the original documents to radiation, the wavelength of which corresponds to the maximum sensitivity of the photosensitive paper, and thence directing the reflected or transmitted rays against the photosensitive paper. The luminescent materials of the present invention are especially suited for the hereinabove described application because they exhibit a narrow emission spectrum, wherein practically all the energy of the luminescence is emitted in the region of maximum sensitivity of the photosensitive papers.

As other utilizations of black light as are contemplated within the scope of this invention, there are mentioned, mineralogical field utilizations in prospecting for petroleum and uranium, the detection of mercury, the luminescence of precious stones; within the medical field, utilization for the examination of nails, hair, teeth, eyes and the skin, or of the nervous and circulatory systems, renal functions, and the surgery field. In the area of quality control and analysis, black light may be used in controlling and/or detecting and/or evaluating: welds and surface conditions, alimentary tract products, textile fibers, "invisible" markings on postal items, signature control [e.g., in philately], document falsifications, criminology, and the confidential marking of documents and placarding, usually to obtain special effects. In the field of scientific research, practical applications extend to the arts of microscopy, chromatography, spectrophotometry and electrophoresis.

The present invention will now be described by the following examples of preparing luminescent materials, as well as by their emission spectra.

EXAMPLE 1

A compound of the formula $Ba_{1-x} Eu_x Si F_6$ is prepared wherein $x$ is 0.0175 which corresponds to the maximum intensity of fluorescence for the barium fluosilicates according to the present invention.

The following fluorides are used in the proportions which are indicated below:

| Starting Compound | Amount Used |
|---|---|
| $Ba F_2$ | 5.174 g |
| $Eu F_2$ | 0.100 g |
| $H_2SiF_6$ | 100 ml |

The powdery fluorides of barium and divalent europium are introduced into a platinum crucible. The fluosilicic acid is poured in and the resulting mixture is heated to 150° C. until all the excessive fluosilicic acid has evaporated.

The crystallographical analysis of the resulting white product shows that its structure is isotypical to that of barium fluosilicate which is described in the literature.

The thus prepared fluosilicate exhibits a sharp line radiation of a wavelength close to 3580Å (see spectrum, FIG. 2) at room temperature under excitation with ultraviolet radiation of wavelength $\lambda = 2537$Å by irradiation with a xenon lamp of 150 watt power.

EXAMPLE 2

The same compound as in Example 1 is prepared using the following fluorides in the proportions which are indicated below:

| Starting Compound | Amount Used |
|---|---|
| $Ba F_2$ | 5.174 g |
| $Eu F_3$ | 0.110 g |
| $H_2SiF_6$ | 100 ml |

The salts of barium and trivalent europium are dissolved in a solution of chlorohydric acid. The solution is passed over a column which contains zinc-mercury amalgam in order to reduce the europium to its divalent state. Subsequently, the solution flows into a solution of fluosilicic acid which has been placed underneath the column. The resulting white precipitate is filtered and then dried at 200° C. It exhibits the same properties as the product which is obtained according to Example 1.

EXAMPLE 3

A compound of the formula $Sr_{1-x} Eu_x Si F_6$ is prepared wherein $x$ equals 0.0225 which corresponds to the maximum intensity of fluorescence for the strontium fluosilicates according to the present invention.

The following fluorides are used in the proportions which are indicated below:

| Starting Compound | Amount Used |
|---|---|
| $Sr F_2$ | 5.526 g |
| $Eu F_2$ | 0.132 g |
| $H_2SiF_6$ | 100 ml |

The method of Example 1 is used for the preparation of the compound.

By crystallographical analysis it is shown that the structure of the thus obtained white product is isotypical to that of barium fluosilicate.

The fluorescene spectrum of the thus prepares strontium fluosilicate which is shown in FIG. 3 exhibits an intense sharp line radiation, the maximum of which is placed at a wavelength of about 3588Å. The irradiation is effected by a xenon lamp at a wavelength $\lambda = 2537$Å.

EXAMPLE 4

A compound of the formula $Sr_{1-x} Eu_x Si F_6$ wherein $x$ is 0.0225 is prepared by reacting $H_2 Si F_6$ with a solid solution of the formula $Sr_{1-x} Eu_x F_2$ wherein $x$ is 0.0225 which is obtained by heating a mixture of 7.36 g of $Sr F_2$ and 0.284 g of $Eu F_3$ to a temperature of 900° C. under a reducing atmosphere.

The method of Example 1 is used for the preparation of the compound using the following starting materials:

| Starting Material | Amount Used |
|---|---|
| $Sr_{0.9775} Eu_{0.0225} F_2$ | 5.718 g |
| $H_2 Si F_6$ | 100 ml |

The resulting luminescent material is identical to the product of Example 3.

EXAMPLE 5

The product of Example 3 can also be obtained by reacting $Si F_4$ with the above-described solid solution of the formula $Sr_{0.9775} Eu_{0.0225} F_2$.

2 g of this solid solution are placed into a platinum boat under a glass enclosure. After evacuating the enclosure, gaseous $Si F_4$ is introduced under a pressure of 0.52 g/cm² and the boat is subsequently heated to 300° C. during 15 hours.

EXAMPLE 6

A compound containing strontium and barium of the formula $Sr_{1-y} Ba_{y-x} Eu_x Si F_6$ wherein $x$ is 0.022 and $y$ is 0.511 is prepared by reacting $H_2 Si F_6$ with a solid solution of the formula $Sr_{1-y} Ba_{y-x} Eu_x F_2$ and heating a mixture of the following amounts of $Sr F_2$, $Ba F_2$ and $Eu F_2$ ($Eu F_3$) to 1000° C. under neutral (or reducing) atmosphere:

$SrF_2$ : 0.360 g, $BaF_2$ : 0.550 g, $EuF_2$ : 0.026 g

The resulting solid solution corresponds to the formula $Sr_{0.489} Ba_{0.489} Eu_{0.022} F_2$.

The parameters of the X-ray diffraction spectrum of the compounds $Sr_{0.489} Ba_{0.489} Eu_{0.022} Si F_6$ according to this invention are situated inbetween these of $Sr Si F_6$ and those of $Ba Si F_6$, as is conformable with the expansion of the lattice parameters when passing from Sr to Ba. The structure of the compound is isotypical to that of barium and strontium fluosilicates.

What is claimed is:

1. A luminescent fluosilicate of the formula $$M_{1-x} Eu_x^{2+} Si F_6$$

wherein $0 < \chi \leq .2$ and M represents at least one alkaline earth metal selected from the group consisting of barium and strontium, said fluosilicate emitting an intense line emission at about 3600Å when excited by ultraviolet radiation of a wavelength between about 2300Å and 3200Å.

2. The fluosilicate as defined in claim 1, wherein $x$ is 0.0225 and M is strontium.

3. The fluosilicate as defined in claim 1, wherein $x$ is 0.0175 and M is barium.

4. The fluosilicate as defined in claim 1, wherein M represents a mixture of barium and strontium.

5. The fluosilicate as defined in claim 4, corresponding to the formula $$Sr_{0.489} Ba_{0.489} Eu_{0.022} Si F_6$$

6. A method for producing black light which comprises the step of irradiating a luminescent material comprising a luminescent fluosilicate as defined in claim 1 with an ultraviolet radiation of a wavelength of between 2300Å and 3200Å to effect an intense line emission from said luminescent material at about 3600Å.

* * * * *